(12) United States Patent
Black et al.

(10) Patent No.: US 8,483,223 B2
(45) Date of Patent: Jul. 9, 2013

(54) PACKET TRANSMISSION VIA MULTIPLE LINKS IN A WIRELESS COMMUNICATION SYSTEM

(75) Inventors: Peter John Black, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1148 days.

(21) Appl. No.: 12/114,427

(22) Filed: May 2, 2008

(65) Prior Publication Data

US 2009/0196294 A1    Aug. 6, 2009

Related U.S. Application Data

(60) Provisional application No. 61/025,651, filed on Feb. 1, 2008.

(51) Int. Cl.
*H04L 12/26* (2006.01)

(52) U.S. Cl.
USPC .......................................................... 370/394

(58) Field of Classification Search
None
See application file for complete search history.

(56) References Cited

U.S. PATENT DOCUMENTS

| | | | |
|---|---|---|---|
| 5,915,094 A | 6/1999 | Kouloheris et al. | |
| 5,920,705 A | 7/1999 | Lyon et al. | |
| 6,236,647 B1 * | 5/2001 | Amalfitano | 370/335 |
| 6,795,435 B1 * | 9/2004 | Jouppi et al. | 370/394 |
| 7,301,917 B2 | 11/2007 | Su | |
| 7,453,878 B1 * | 11/2008 | Martin et al. | 370/394 |
| 2002/0051445 A1 | 5/2002 | Drottar et al. | |
| 2002/0087716 A1 * | 7/2002 | Mustafa | 709/236 |
| 2003/0039250 A1 * | 2/2003 | Nichols et al. | 370/394 |
| 2003/0133452 A1 | 7/2003 | Su | |
| 2004/0125743 A1 * | 7/2004 | Hashem et al. | 370/208 |
| 2004/0177307 A1 * | 9/2004 | Chao | 714/752 |
| 2007/0008934 A1 * | 1/2007 | Balasubramanian et al. | 370/335 |

(Continued)

FOREIGN PATENT DOCUMENTS

| | | |
|---|---|---|
| CN | 1953567 A | 4/2007 |
| JP | 2000216815 A | 8/2000 |

(Continued)

OTHER PUBLICATIONS

European Search Report—EP10015278, Search Authority—Munich Patent Office, Jun. 22, 2011.

(Continued)

*Primary Examiner* — Chirag Shah
*Assistant Examiner* — Amar Persaud
(74) *Attorney, Agent, or Firm* — Donald C. Kordich

(57) ABSTRACT

Techniques for generating and transmitting packets on multiple links in a wireless communication system are described. In one aspect, a transmitter generates new packets for the multiple links based on the likelihood of each link being available. The transmitter determines the likelihood of each carrier being available based on whether or not there is a pending packet on that carrier and, if yes, the number of subpackets sent for the pending packet. The transmitter generates new packets such that packets for links progressively less likely to be available contain data units with progressively higher sequence numbers. The transmitter determines whether each link is available and sends a packet on each link that is available. In another aspect, the transmitter generates and sends new packets in a manner to ensure in-order transmission. In one design, the transmitter generates new packets for each possible combination of links that might be available.

43 Claims, 12 Drawing Sheets

U.S. PATENT DOCUMENTS

| | | | |
|---|---|---|---|
| 2007/0150631 A1* | 6/2007 | Druke et al. | 710/244 |
| 2007/0153749 A1* | 7/2007 | Waxman | 370/338 |
| 2007/0297325 A1* | 12/2007 | Larsson | 370/216 |
| 2008/0069040 A1* | 3/2008 | An | 370/329 |
| 2009/0086664 A1* | 4/2009 | Wu | 370/328 |
| 2010/0098101 A1* | 4/2010 | Drottar et al. | 370/402 |

FOREIGN PATENT DOCUMENTS

| | | |
|---|---|---|
| JP | 2000216815 A | 8/2000 |
| JP | 2001036964 A | 2/2001 |
| JP | 2001036964 A | 2/2001 |
| JP | 2002051001 A | 2/2002 |
| JP | 2002051001 A | 2/2002 |
| RU | 2189072 | 9/2002 |

OTHER PUBLICATIONS

Taiwan Search Report—TW098103260—TIPO—May 28, 2012.
International Search Report and Written Opinion—PCT/US2009/032554, International Search Authority—European Patent Office—Nov. 8, 2009.

* cited by examiner

PACKET TRANSMISSION VIA MULTIPLE LINKS IN A WIRELESS COMMUNICATION SYSTEM

The present application claims priority to provisional U.S. application Ser. No. 61/025,651, entitled "Multi-Carrier Reverse Link" filed Feb. 1, 2008, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may employ hybrid automatic repeat request (HARQ) to improve reliability of data transmission. With HARQ, a transmitter may generate multiple subpackets for a data packet and may send one or more subpackets until the packet is decoded correctly by a receiver or the maximum number of subpackets has been sent. Different packets may be successfully decoded with different numbers of subpackets depending on channel conditions and other factors.

The transmitter may send data to the receiver via one or more links. Each link may be associated with certain radio resources (e.g., a different carrier) usable for data transmission. If there is only one link, then the transmitter may send packets sequentially via this link, one packet at a time. The receiver would then receive the packets in the proper order. If there are multiple links, then the transmitter may send multiple packets in parallel via these links. These multiple packets may terminate at different times depending on the number of subpackets needed for each packet. It may be desirable to send the packets in a manner such that the packets can be received either in order or with as few packets out of order as possible.

SUMMARY

Techniques for generating and transmitting packets on multiple parallel links (e.g., multiple carriers) in a manner to reduce or avoid out-or-order transmission of packets sent on the multiple links are described herein. The data to send may be partitioned into data units. Each data unit may be associated with a sequence number that indicates the position of that data unit among the available data units. Each packet may include any number of data units, which may be dependent on the packet size and the data unit size.

In one aspect, a transmitter generates new packets for multiple links based on the likelihood of each link being available at the next transmission opportunity. In one design, the transmitter determines the likelihood of each link being available based on whether or not there is a pending packet on that link and, if yes, the number of subpackets sent for the pending packet. The transmitter generates new packets such that packets for links that are progressively less likely to be available contain data units with progressively higher sequence numbers. The transmitter thereafter determines whether each link is available, e.g., based on an acknowledgement (ACK) or a negative acknowledgement (NAK) received for a pending packet on that link. The transmitter then sends a packet on each link that is available. By generating packets in this manner, the number of packets sent out of order may be reduced.

In another aspect, the transmitter generates and sends new packets in a manner to ensure in-order transmission of the packets. In one design, the transmitter generates new packets for each possible combination of links that might be available at the next transmission opportunity. The number of new packets to generate is dependent on the number of links as well as the packet size for each link. The transmitter may generate up to three new packets for two links, up to seven new packets for three links, etc. The transmitter generates the new packets such that one new packet can be sent on each available link and also such that data units in sent packets have sequence numbers lower than sequence numbers of unsent data units, if any.

Various aspects and features of the disclosure are described in further detail below.

DETAILED DESCRIPTION

The data transmission techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. cdma2000 covers IS-2000, IS-95, and IS-856 standards. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

For clarity, certain aspects of the techniques are described below for a High Rate Packet Data (HRPD) system that implements IS-856. HRPD is also referred to as CDMA2000 1xEV-DO (Evolution-Data Optimized), 1xEV-DO, 1x-DO, DO, High Data Rate (HDR), etc. HRPD is described in 3GPP2 C.S0024-B, entitled "cdma2000 High Rate Packet Data Air Interface Specification," dated March 2007, which is publicly available. For clarity, HRPD terminology is used in much of the description below.

Figure 1:
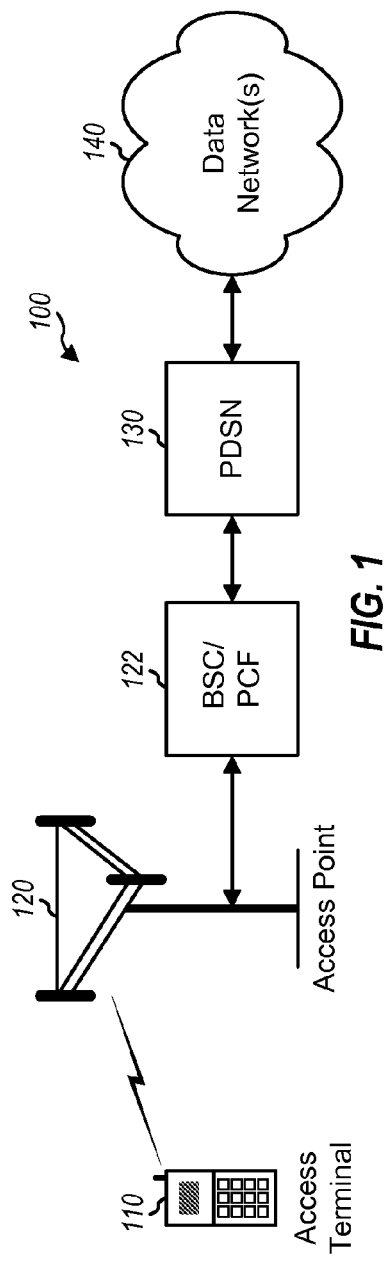
FIG. 1 shows a wireless communication system.

FIG. 1 shows a wireless communication system 100, which may be an HRPD system. Wireless system 100 may include a number of access points and a number of Base Station Controllers/Packet Control Functions (BSCs/PCFs). For simplicity, only one access point 120 and one BSC/PCF 122 are shown in FIG. 1. An access point is generally a fixed station that communicates with the access terminals and may also be referred to as a base station, a Node B, an evolved Node B, etc. BSC/PCF 122 couples to a set of access points, provides coordination and control for the access points under its control, and routes data for these access points. A Packet Data Serving Node (PDSN) 130 supports data services for access terminals. PDSN 130 may be responsible for establishment, maintenance, and termination of data sessions for access terminals and may further assign dynamic Internet Protocol (IP) addresses to the access terminals. PDSN 130 may couple to data network(s) 140, which may comprise a core network, private and/or public data networks, the Internet, etc. Wireless system 100 may include other network entities not shown in FIG. 1.

An access terminal (AT) 110 may communicate with wireless system 100 to obtain communication services. Access terminal 110 may also be referred to as a mobile station, a user equipment, a user terminal, a subscriber unit, a station, etc. Access terminal 110 may be a cellular phone, a personal digital assistant (PDA), a wireless modem, a handheld device, a laptop computer, etc. Access terminal 110 may communicate with access point 120 via the forward and reverse links. The forward link (or downlink) refers to the communication link from the access point to the access terminal, and the reverse link (or uplink) refers to the communication link from the access terminal to the access point. The data transmission techniques described herein may be used for the forward link as well as the reverse link. For clarity, certain aspects of the techniques are described below for data transmission on the reverse link.

System 100 may support multi-carrier operation on the forward and/or reverse link. For multi-carrier operation, a transmitter may send packets in parallel on multiple CDMA channels, with each CDMA channel being 1.2288 MHz wide in HRPD. A CDMA channel may also be referred to as a carrier. Multiple links may be available with multi-carrier operation, and each link may correspond to a different CDMA channel or carrier.

System 100 may support HARQ on the forward and/or reverse link. For HARQ in HRPD, a transmitter processes a data packet to generate a coded packet and further partitions the coded packet into multiple (S) subpackets, where S may be four or some other value. The S subpackets for the packet may be assigned sequential subpacket identifiers (SPIDs), so that the first subpacket is assigned SPID=1, the second subpacket is assigned SPID=2, and so on, and the last subpacket is assigned SPID=S. Each subpacket contains sufficient information to allow a receiver to decode and recover the packet under favorable channel conditions. The S subpackets contain different redundancy information for the packet and are transmitted in sequential order. Thus, the first subpacket is transmitted first, followed by the second subpacket if needed, followed by the third subpacket if needed, etc. All or a subset of the S subpackets may be transmitted for the packet.

Figure 2:
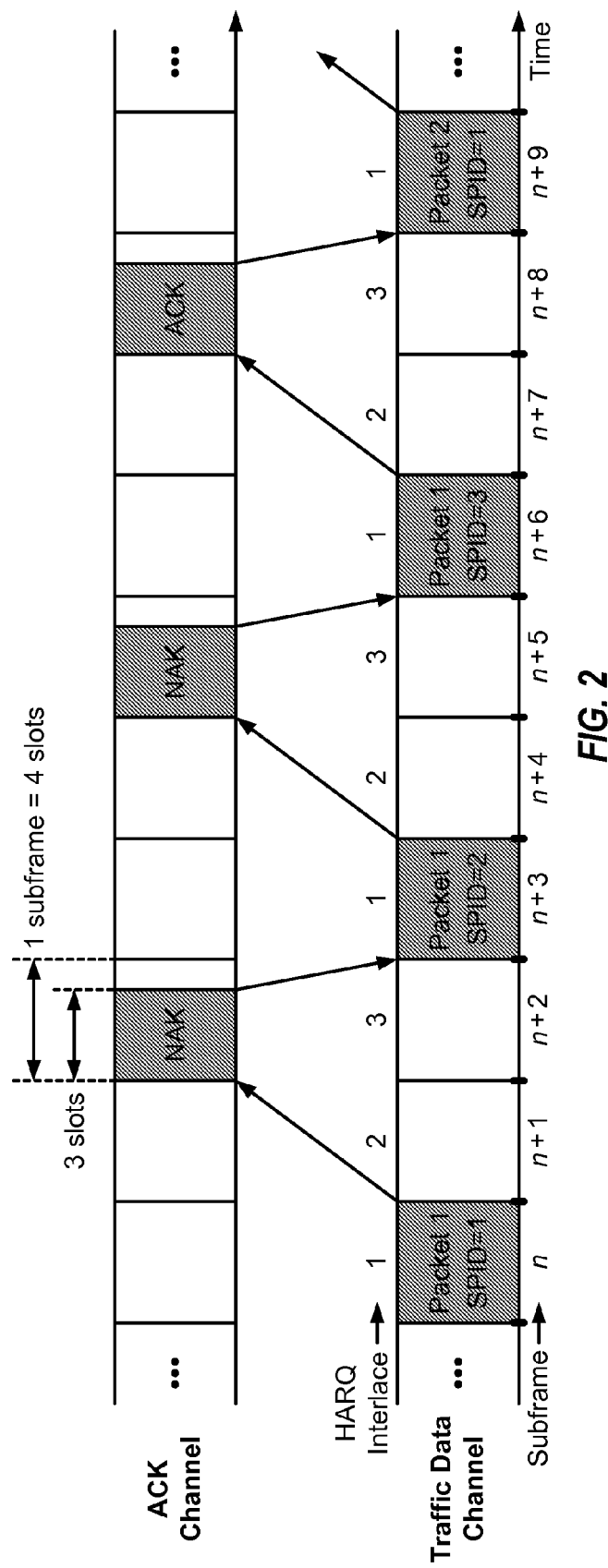
FIG. 2 shows data transmission with HARQ.

FIG. 2 shows an example data transmission with HARQ. In HRPD, the transmission time line is partitioned into subframes, with each subframe including four slots and having a duration of 6.667 milliseconds (ms). Each subpacket may be sent in one subframe. The transmission time line is also partitioned into three HARQ interlaces 1, 2 and 3. Each HARQ interlace includes every third subframe, and the three HARQ interlaces occupy non-overlapping subframes. The subpackets for each packet may be sent in different subframes on one HARQ interlace. For simplicity, much of the description below is for one HARQ interlace. The same processing may be repeated for each HARQ interlace available for data transmission.

In the example shown in FIG. 2, a transmitter (e.g., access terminal 110) transmits the first subpacket (SPID=1) of packet 1 on a Traffic Data Channel in subframe n. A receiver (e.g., access point 120) receives the first subpacket, decodes packet 1 in error based on the first subpacket, and sends a NAK on an ACK channel in subframe n+2. The transmitter receives the NAK and transmits the second subpacket (SPID=2) of packet 1 in subframe n+3. The receiver receives the second subpacket, decodes packet 1 in error based on both the first and second subpackets, and sends a NAK on the ACK channel in subframe n+5. The transmitter receives the NAK and transmits the third subpacket (SPID=3) of packet 1 in subframe n+6. The receiver receives the third subpacket, decodes packet 1 correctly based on all three subpackets, and sends an ACK on the ACK channel in subframe n+8. The transmitter receives the ACK and transmits the first subpacket (SPID=1) of the next packet 2 in subframe n+9. Data transmission continues in this manner for each packet.

In HRPD, multiple subpackets may be sent for a packet. In other system, multiple transmissions, multiple HARQ transmissions, or multiple blocks may be sent for a packet. Thus, the terms "subpacket", "HARQ transmission," "transmission", and "block" are synonymous and used interchangeably.

In the design shown in FIG. 2, a new subpacket may be sent in every three subframes, and there is a delay of two subframes for the ACK/NAK for each subpacket. Since the ACK/NAK spans three slots, there is a delay of one slot from the end of the ACK/NAK to the start of the next transmission opportunity. This one slot delay may provide insufficient amount of time to generate or construct a new packet. In this case, the transmitter may fetch data from a data queue and generate a new packet sufficiently early so that the packet is available at the next transmission opportunity. Just before transmission time, the transmitter may determine whether a pending packet has terminated. A pending packet is a packet that is currently being transmitted and may also be referred to as an in-flight packet. If the pending packet has terminated, then the transmitter may send the new packet. Otherwise, the transmitter may dismantle the new packet and return the payload back to the data queue.

FIG. 2 shows data transmission via a single carrier. For multi-carrier operation, multiple packets may be sent simultaneously via multiple carriers.

Figure 3:
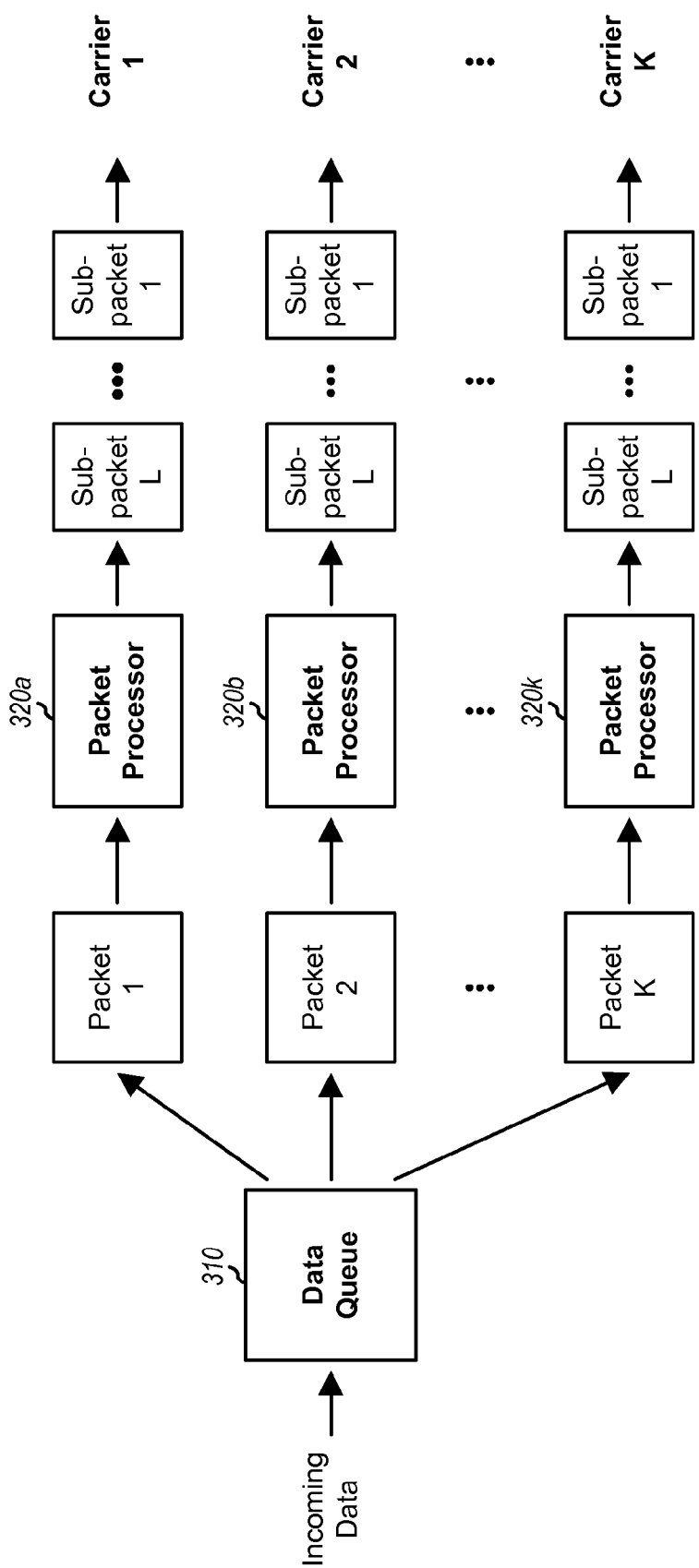
FIG. 3 shows processing of data for transmission on multiple (K) carriers.

FIG. 3 shows processing of data by the transmitter for data transmission via multiple (K) carriers. A data queue 310 receives and buffers incoming data and provides the data whenever transmission resources are available. The incoming data may be sent in a first in first out (FIFO) manner, so that earlier arriving data is sent before later arriving data. The incoming data may also be partitioned into data units, with each data unit having a suitable size. For example, a data unit may have a size of one octet or some other size. The data units may be assigned sequentially increasing sequence numbers. The sequence number may start at zero, increment by one for each data unit, and wrap around to zero after reaching a maximum value of $2^B-1$, where B is the number of bits for the sequence number. For simplicity, in the description below, the earliest data unit in the data queue is deemed to have the lowest sequence number (which may actually be larger than the sequence numbers of later data units because of the wrap around). The sequence number may be assigned by Radio Link Protocol (RLP) or some other protocol and may be used by the receiver for re-assembly of the data units and/or other purposes.

In the example shown in FIG. 3, data queue 310 provides packets 1 through K to packet processors 320a through 320k, respectively. Each packet processor 320 processes its packet and provides L subpackets for one carrier. One or more subpackets may be sent for each packet via one carrier.

Figure 4:
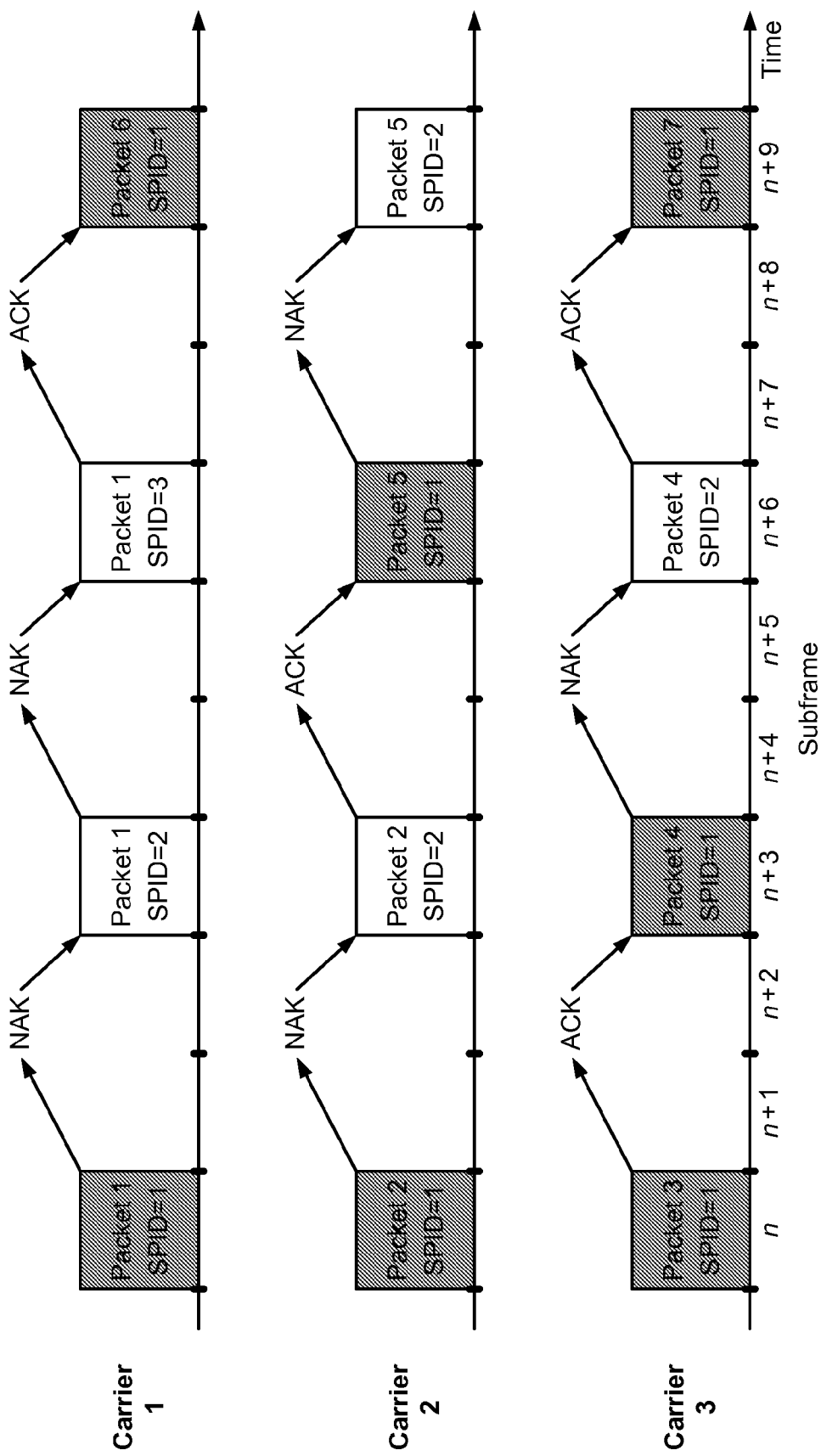
FIG. 4 shows data transmission on three carriers.

FIG. 4 shows an example data transmission on K=3 carriers. In FIG. 4, the first subpacket of each packet is shown with shading, and the remaining subpackets of each packet are shown without shading.

In subframe n, the first subpackets of packets 1, 2 and 3 are sent on carriers 1, 2 and 3, respectively. Packets 1 and 2 are decoded in error, and packet 3 is decoded correctly. In subframe n+3, the second subpackets of packets 1 and 2 and the first subpacket of a new packet 4 are sent on carriers 1, 2 and 3, respectively. Packets 1 and 4 are decoded in error, and packet 2 is decoded correctly. In subframe n+6, the third subpacket of packet 1, the first subpacket of a new packet 5, and the second subpacket of packet 4 are sent on carriers 1, 2 and 3, respectively. Packets 1 and 4 are decoded correctly, and packet 5 is decoded in error. In subframe n+9, the first subpacket of a new packet 6, the second subpacket of packet 5, and the first subpacket of a new packet 7 are sent on carriers 1, 2 and 3, respectively. Data transmission continues in this manner in each subsequent subframe.

As shown in FIG. 4, multiple transmission opportunities may occur at the same time for multi-carrier operation. After sending subpackets for K pending packets (e.g., in subframe n), the transmitter may generate K new packets for possible transmission in the next available subframe. However, the transmitter may generate the new packets (e.g., during subframe n+1) without knowing whether any pending packet or which pending packets are decoded correctly by the receiver, since the ACK/NAK for each pending packet may not be received until later (e.g., during subframe n+2). Generating the new packets without knowing the decoding status of the pending packets may result in the new packets being sent out of order.

Figure 5:
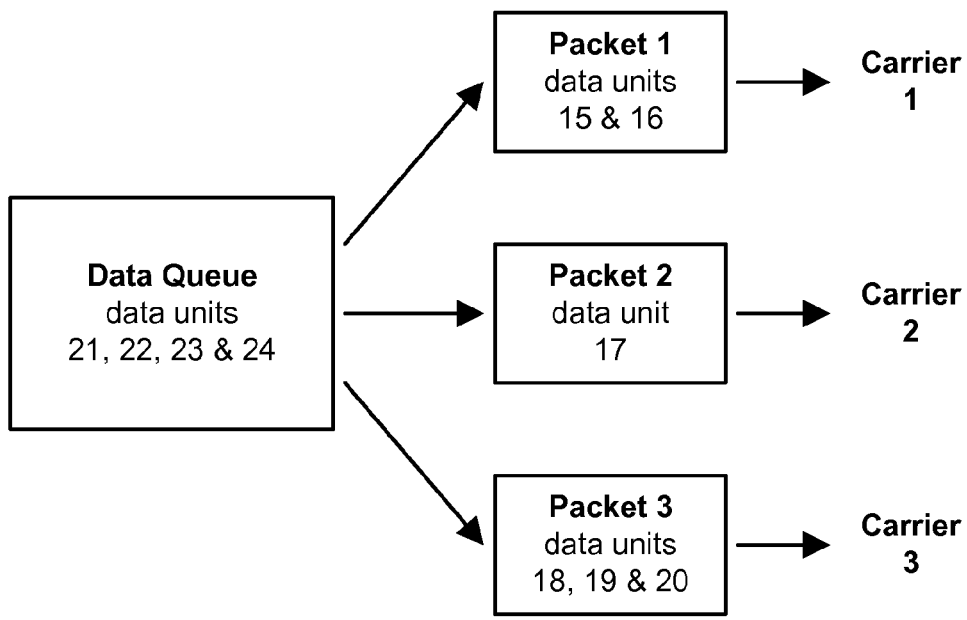
FIG. 5 shows generation of three packets for three carriers.

FIG. 5 shows an example of out-of-sequence transmission of new packets due to unknown decoding status of pending packets. In this example, the data queue contains data units 15 through 24, with data unit 15 having the lowest sequence number and data unit 24 having the highest sequence number. A packet for carrier 1 can contain two data units, a packet for carrier 2 can contain one data unit, and a packet for carrier 3 can contain three data units. Three new packets 1, 2 and 3 are generated after transmission of three pending packets X, Y and Z on three carriers 1, 2 and 3, respectively. In this example, the data units are provided to the new packets in sequential order, so that the first two data units 15 and 16 are provided to packet 1, the next data unit 17 is provided to packet 2, and the next three data units 18, 19 and 20 are provided to packet 6.

If only pending packet Z sent on carrier 3 is decoded correctly, then only packet 3 is sent on carrier 3. In this case, packet 3 carrying data units 18, 19 and 20 will be sent before packet 1 carrying data units 15 and 16 and packet 2 carrying data unit 17, thus resulting in out-of-order transmission of the data units. Data units 15, 16 and 17 may be returned to the data queue for transmission at the next transmission opportunity.

In a first transmission scheme, the transmitter generates new packets in a manner to reduce the number of packets sent out of order. The transmitter typically generates and transmits a packet such that the receiver can correctly decode the packet with a certain probability after a target number of subpackets. This target number of subpackets is referred to as a termination target (TT) of the packet. The termination target is typically less than the maximum number of subpackets, or TT<S, and may be selected based on various factors. The receiver typically decodes the packet based on all received subpackets. The likelihood of correctly decoding the packet may then increase with the number of subpackets transmitted for the packet. The transmitter can determine the likelihood of transmitting a new packet on each carrier based on the likelihood of a pending packet on that carrier being decoded correctly, which may in turn be determined based on the number of subpackets transmitted for the pending packet. The transmitter may generate new packets such that (i) a new packet that is most likely to be transmitted contains data units with the lowest sequence numbers and (ii) a new packet that is least likely to be transmitted contains data units with the highest sequence numbers among all data units used for the new packets.

In one design, the transmitter generates K new packets for K carriers as follows. The transmitter first determines the priority of each carrier k as follows:

$$\text{Priority\_Number}(k) = \begin{cases} \text{Max\_Priority} & \text{if number of transmitted subpackets} = S \\ \text{Max\_Priority} & \text{if no packet is pending} \\ SPID(k) - TT(k) & \text{otherwise,} \end{cases} \quad \text{Eq (1)}$$

where SPID(k) is the identifier of the subpacket sent most recently on carrier k, which is also the number of subpackets sent for a pending packet on carrier k, and TT(k) is the termination target for the pending packet on carrier k.

In equation (1), carrier k has the maximum priority if there is no pending packet on carrier k or if the maximum number of subpackets has been sent for the pending packet. Either of these two conditions means that a new packet can be sent on carrier k at the next transmission opportunity. The maximum priority may be set to a value that is always higher than SPID(k)−TT(k). If neither of the two conditions is met, then the priority of carrier k is determined by the number of subpackets SPID(k) transmitted for the pending packet and the termination target TT(k) for the pending packet on carrier k. The priority of each carrier k can range from 1−TT(k) after transmitting one subpacket to S−TT(k)−1 after transmitting S−1 subpackets. If there is a tie from equation (1) and more than one carrier has the same priority, then the tie may be broken randomly or based on additional information. In general, the K carriers may be assigned priorities such that the carrier with the highest priority is most likely to be available and the carrier with the lowest priority is least likely to be available.

Figure 6:
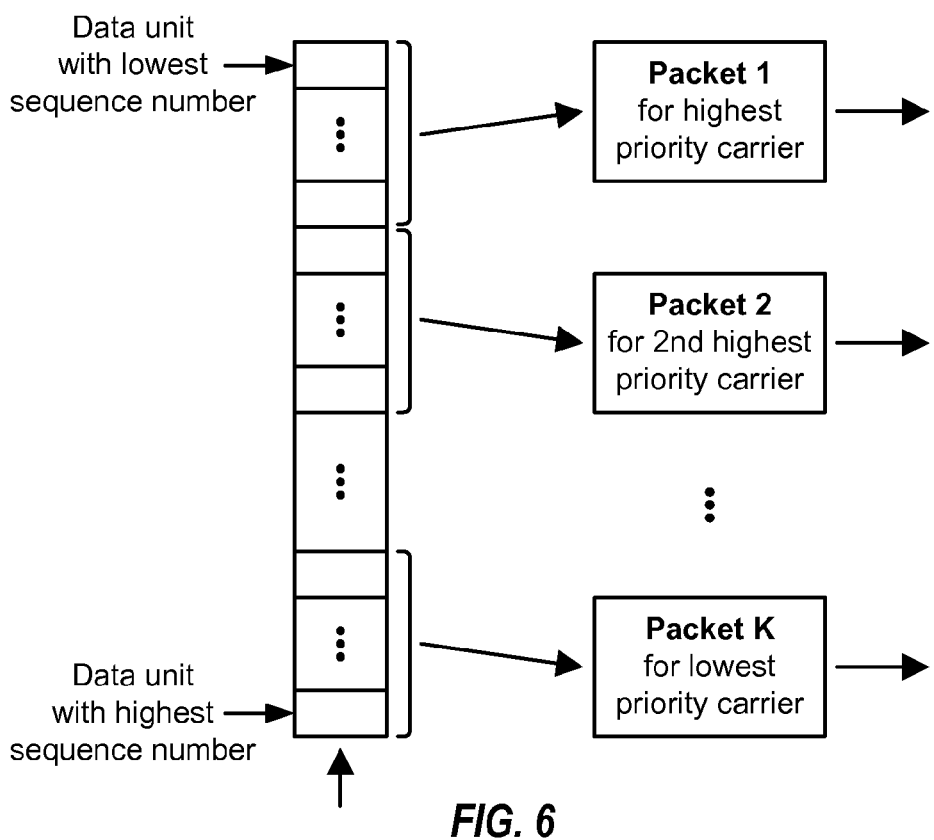
FIG. 6 shows generation of K new packets for K carriers based on priorities.

FIG. 6 shows a design for generating K new packets for the K carriers based on the priorities of these carriers. In this design, the data units with the lowest sequence numbers are provided to a new packet for the carrier with the highest priority, then the data units with the next higher sequence numbers are provided to a new packet for the carrier with the second highest priority, etc, and data units with the highest sequence numbers are provided to a new packet for the carrier with the lowest priority.

Figure 7:
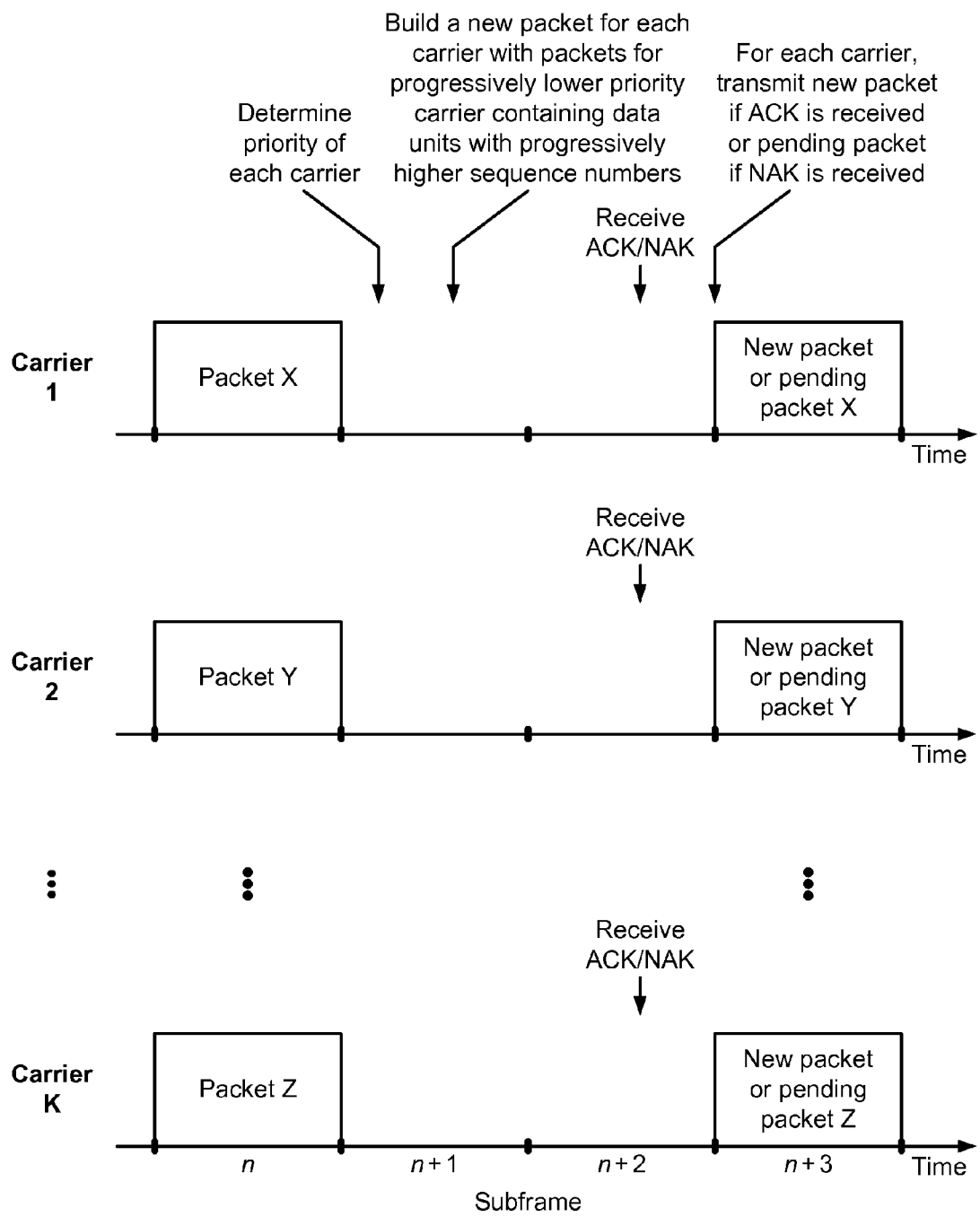
FIG. 7 shows transmission of the K new packets on the K carriers.

FIG. 7 shows data transmission on the K carriers in accordance with the first transmission scheme. The transmitter may send subpackets for K pending packets X through Z in subframe n. The transmitter may determine the priorities of the K carriers in subframe n+1. The transmitter may generate K new packets for the K carriers in subframe n+1 based on the priorities of these carriers. The transmitter may receive an ACK or a NAK for each of the K pending packets in subframe n+2. For each subcarrier k, the transmitter may send a new packet generated for that carrier if the pending packet has been decoded correctly and hence terminated and may continue to send the pending packet if it is decoded in error. The transmitter may send zero or more of the K new packets on the K carriers, depending on the decoding status of the K pending packets.

The transmitter may send one or more new packets out of order if a pending packet on a lower priority carrier is terminated while another pending packet on a higher priority carrier is not terminated. If a new packet is sent out of order, then one or more unsent new packets would contain data units with lower sequence numbers than those of the data units in the sent new packet. The transmitter may ensure that the unsent data units with lower sequence numbers will be sent at the next transmission opportunity. This may be achieved by transferring the unsent data units with lower sequence numbers to a high priority queue having higher priority than the data queue.

Figure 8:
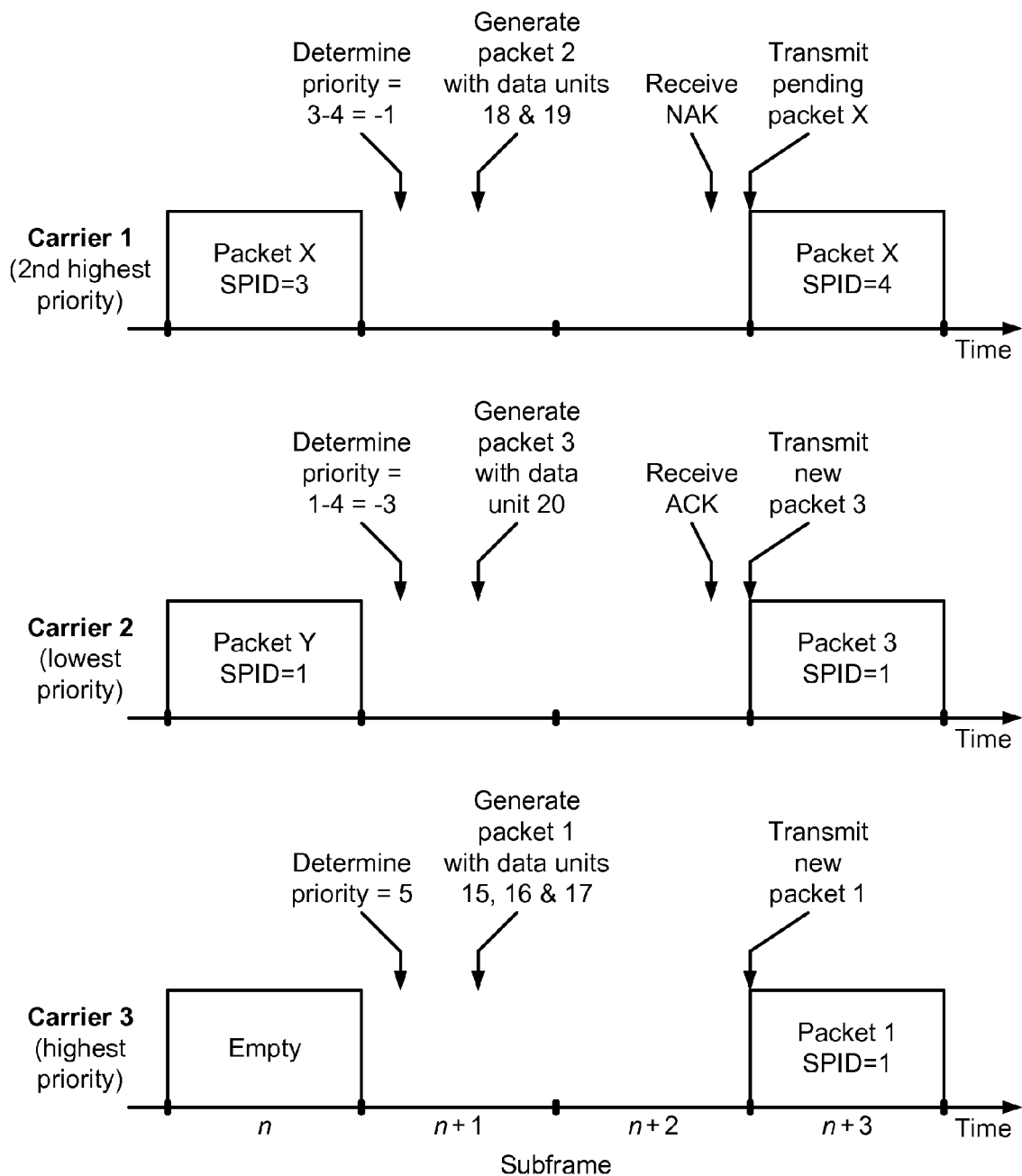
FIG. 8 shows transmission of three packets on three carriers.

FIG. 8 shows an example data transmission on three carriers in accordance with the first transmission scheme. In this example, the transmission target is four, and the maximum priority is five. In subframe n, the transmitter sends the third subpacket (SPID=3) of pending packet X on carrier 1, the first subpacket (SPID=1) of pending packet Y on carrier 2, and no subpacket on carrier 3. In subframe n+1, the transmitter determines the priority of each carrier, with carrier 3 having the highest priority of 5, carrier 1 having the second highest priority of SPID−TT=3−4=−1, and carrier 2 having the lowest priority of SPID−TT=1−4=−3. The transmitter generates a new packet 1 containing data units 15, 16 and 17 with the lowest sequence numbers for the highest priority carrier 3, a new packet 2 containing data units 18 and 19 with the next higher sequence numbers for the second highest priority carrier 1, and a new packet 3 containing data unit 20 with the highest sequence number for the lowest priority carrier 2. In subframe n+2, the transmitter receives a NAK for pending packet X on carrier 1 and an ACK for pending packet Y on carrier 2. In subframe n+3, the transmitter sends new packet 1 with data units 15, 16 and 17 on carrier 3 and new packet 3 with data unit 20 on carrier 2. Since pending packet X on carrier 1 is not terminated, the transmitter does not send new packet 2 on carrier 1 and stores data units 18 and 19 back in the data queue or the high priority queue for transmission at the next transmission opportunity.

In a second transmission scheme, the transmitter generates and sends new packets in a manner to ensure in-order transmission of the packets. In one design, the transmitter generates new packets for each possible combination of carriers that might be available at the next transmission opportunity. The number of new packets to generate is greater than the number of carriers and is dependent on the number of carriers as well as the packet size for each carrier. The transmitter sends an appropriate subset of the new packets on the available carriers.

Figure 9:
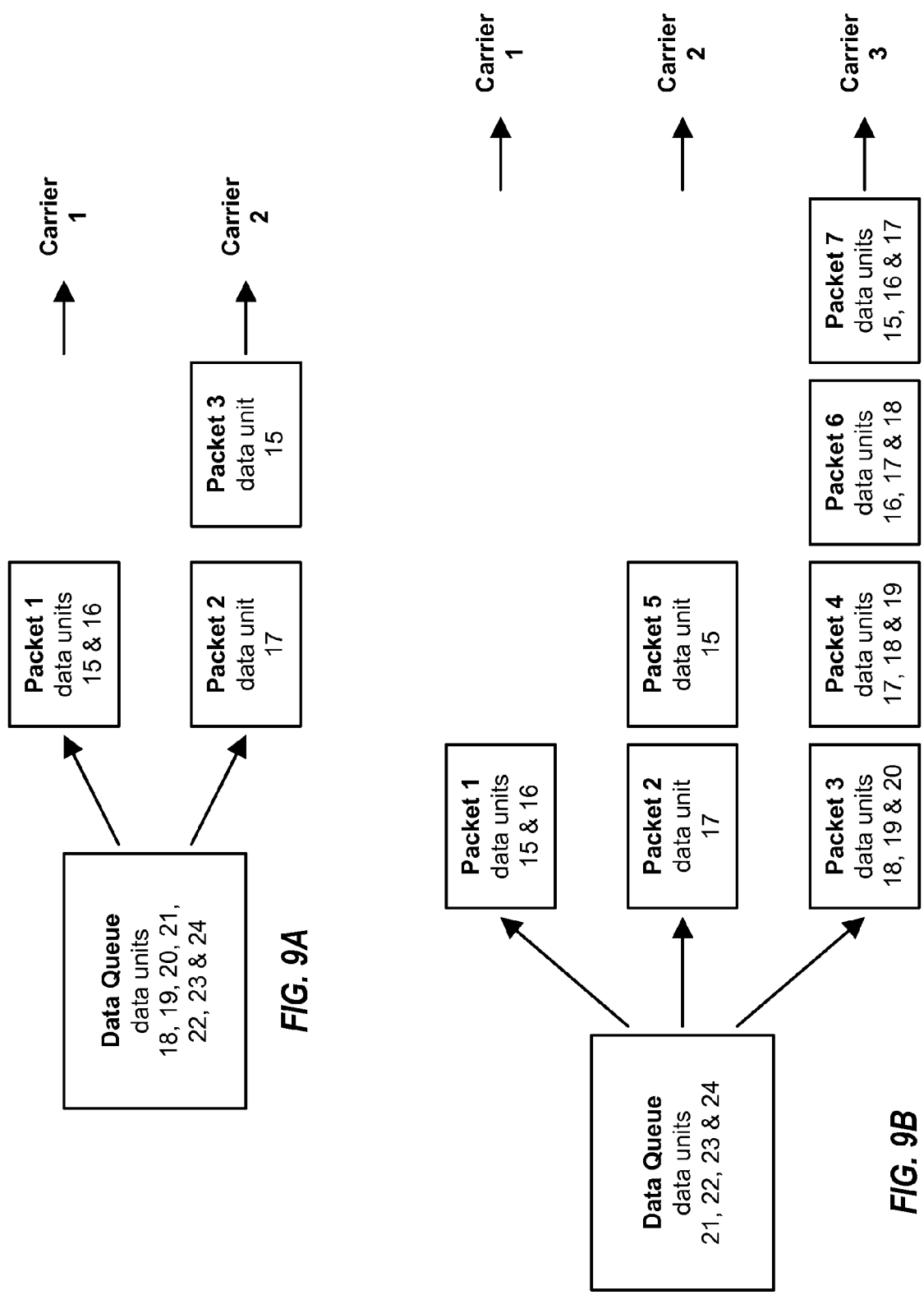
FIG. 9A shows generation of three packets for two carriers.
FIG. 9B shows generation of seven packets for three carriers.

FIG. 9A shows an example of packet generation for the second transmission scheme with two carriers 1 and 2. In this example, a packet for carrier 1 can contain two data units, a packet for carrier 2 can contain one data unit, and the data queue contains data units 15 through 24. The transmitter generates a new packet 1 containing two data units 15 and 16, a new packet 2 containing one data unit 17, and a new packet 3 containing one data unit 15.

If the pending packets on carriers 1 and 2 are terminated, then the transmitter sends new packet 1 on carrier 1 and new packet 2 on carrier 2. If only the pending packet on carrier 1 is terminated, then the transmitter sends new packet 1 on carrier 1 and returns data unit 17 to the data queue. If only the pending packet on carrier 2 is terminated, then the transmitter sends new packet 3 on carrier 2 and returns data units 16 and 17 to the data queue.

FIG. 9B shows an example of packet generation for the second transmission scheme with three carriers 1, 2 and 3. In this example, a packet for carrier 1 can contain two data units, a packet for carrier 2 can contain one data unit, a packet for carrier 3 can contain three data units, and the data queue contains data units 15 through 24. The transmitter generates seven new packets as follows:

New packet 1 containing two data units 15 and 16,
New packet 2 containing one data unit 17,
New packet 3 containing three data units 18, 19 and 20,
New packet 4 containing three data units 17, 18 and 19,
New packet 5 containing one data unit 15,
New packet 6 containing three data units 16, 17 and 18, and
New packet 7 containing three data units 15, 16 and 17.

The transmitter may send up to three new packets on up to three carriers depending on the decoding status of the pending packets on the three carriers. Table 1 lists eight different transmission scenarios for the three carriers and indicates the packet to send on each available carrier in each scenario. Each scenario corresponds to a different combination of carriers being available for transmission.

TABLE 1

| Scenario | Carrier 1 | Carrier 2 | Carrier 3 |
| --- | --- | --- | --- |
| 1 | Packet 1 | Packet 2 | Packet 3 |
| 2 | Packet 1 | Packet 2 | none |
| 3 | Packet 1 | none | Packet 4 |
| 4 | Packet 1 | none | none |
| 5 | none | Packet 5 | Packet 6 |
| 6 | none | Packet 5 | none |
| 7 | none | none | Packet 7 |
| 8 | none | none | none |

In scenario 1, the pending packets on all three carriers 1, 2 and 3 are terminated. The transmitter sends new packets 1, 2 and 3 on carriers 1, 2 and 3, respectively. In scenario 2, the pending packets on only two carriers 1 and 2 are terminated. The transmitter sends new packets 1 and 2 on carriers 1 and 2, respectively, and returns data units 18, 19 and 20 to the data queue. In scenario 3, the pending packets on only two carriers 1 and 3 are terminated. The transmitter sends new packets 1 and 4 on carriers 1 and 3, respectively, and returns data unit 20 to the data queue. The packet transmission for each remaining scenario is shown in Table 1. The packets may also be generated in other manners, and different combinations of packets may be sent for each scenario.

In the example shown in FIG. 9B, the new packets for the three carriers have different sizes, and seven new packets are generated for all possible scenarios. If the packets for multiple carriers have the same size, then the number of packets to generate may be reduced since a given packet may be sent on more than one carrier.

In general, any number of new packets may be generated for any number of carriers. Multiple new packets containing different data units may be generated for a given carrier, and one packet may be sent on this carrier depending on the termination status of the carrier.

In the examples shown in FIGS. 9A and 9B, the transmitter generates new packets for all possible combinations of carriers that might be available at the next transmission opportunity. Hence, it is not necessary to know the likelihood of each carrier being available at the next transmission opportunity.

In a third transmission scheme, the transmitter generates and sends new packets in a manner to reduce the number of packets sent out of order and to reduce the number of new packets to generate. In one design, the transmitter first determines the likelihood of each carrier being available at the next transmission opportunity and generates a new packet for each carrier based on the likelihood of availability for the K carriers, as described above for the first transmission scheme. The transmitter further generates one or more additional packets in anticipation of an erroneous prediction due to one or more carriers deemed most likely to be available being unavailable. The third transmission scheme may be considered as a combination of the first and second transmission schemes.

Figure 10:
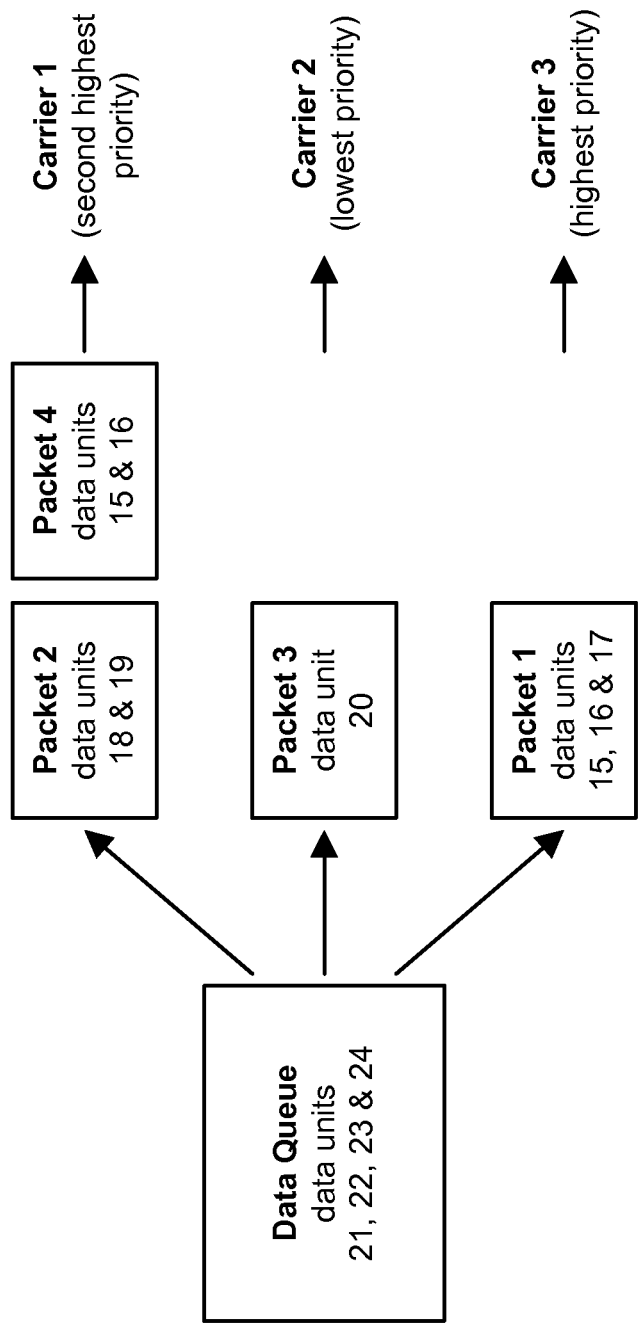
FIG. 10 shows generation of four packets for three carriers.

FIG. 10 shows an example of packet generation for the third transmission scheme with three carriers 1, 2 and 3. In this example, a packet for carrier 1 can contain two data units, a packet for carrier 2 can contain one data unit, a packet for carrier 3 can contain three data units, and the data queue contains data units 15 through 24. Carrier 3 is most likely to be available at the next transmission opportunity, carrier 1 is the second most likely to be available, and carrier 2 is the least likely to be available.

The transmitter generates a new packet 1 containing three data units 15, 16 and 17 for carrier 3, a new packet 2 containing two data units 18 and 19 for carrier 1, and a new packet 3 containing one data unit 20 for carrier 3. The transmitter also generates an additional new packet 4 containing two data units 15 and 16 for carrier 1.

If the pending packets on all three carriers are terminated, then the transmitter sends new packets 2, 3 and 1 on carriers 1, 2 and 3, respectively. If the pending packet on carrier 3 (which is most likely to be available) is not terminated but the pending packet on carrier 1 (which is second most likely to be available) is terminated, then the transmitter sends new packet 4 on carrier 1 and returns data units 17 to 20 to the data queue.

In one design, which is shown in FIG. 10 for the case of three carriers, the transmitter generates three new packets for the two carriers most likely to be available and have the two highest priorities. For these two carriers, the transmitter would be able to send a new packet in order on each carrier that is available. The transmitter also generates K−2 new packets for the K−2 remaining carriers, one new packet for each remaining carrier, based on the priorities of these remaining carriers and assuming that the two highest priority carriers will be available. The transmitter transmits each of the K−2 new packets on a corresponding one of the K−2 remaining carriers if that carrier is available. The transmitter may send the K−2 new packets out of order depending on which one(s) of the K−2 remaining carriers are available.

In another design, the transmitter generates a new packet for each carrier with an assumption that only that carrier will be available at the next transmission opportunity. In the example shown in FIG. 10, the transmitter would generate a second additional packet containing one data unit 15 for carrier 2.

In another design, the transmitter determines the likelihood of each possible transmission scenario occurring at the next transmission opportunity. For the case with three carriers, the eight possible transmission scenarios are shown in Table 1. The transmitter generates K new packets for the scenario in which all K carriers will be available. The transmitter also generates one or more additional new packets for one or more other more likely scenarios.

The transmitter may generate one or more additional packets for data in the data queue, as shown in FIG. 10. The transmitter may also generate additional packets to ensure that data in the high priority queue can be sent at the next transmission opportunity. For example, the transmitter may generate a new packet containing data units in the high priority queue for each carrier. This would then ensure that the data units in the high priority queue can be sent on any available carrier.

In a fourth transmission scheme, the transmitter generates new packets based on the likelihood of the carriers being available and sends the new packets in a manner to ensure in-order transmission of the packets. In one design, the transmitter first determines the likelihood of each carrier being available at the next transmission opportunity and generates a new packet for each carrier based on the likelihood of availability for the K carriers, as described above for the first transmission scheme. For each carrier, the transmitter sends a new packet on that carrier only if all carriers with higher priorities are also available. In one design, the transmitter traverses through the K carriers, one carrier at a time, starting with the highest priority carrier. For each carrier being considered, the transmitter sends a new packet on that carrier if it is available. Upon encountering a carrier that is unavailable, the transmitter terminates the process and returns all data units in unsent new packets, if any, to the data queue. The fourth transmission scheme may be considered as a variant of the first transmission scheme.

Figures 11, 12:
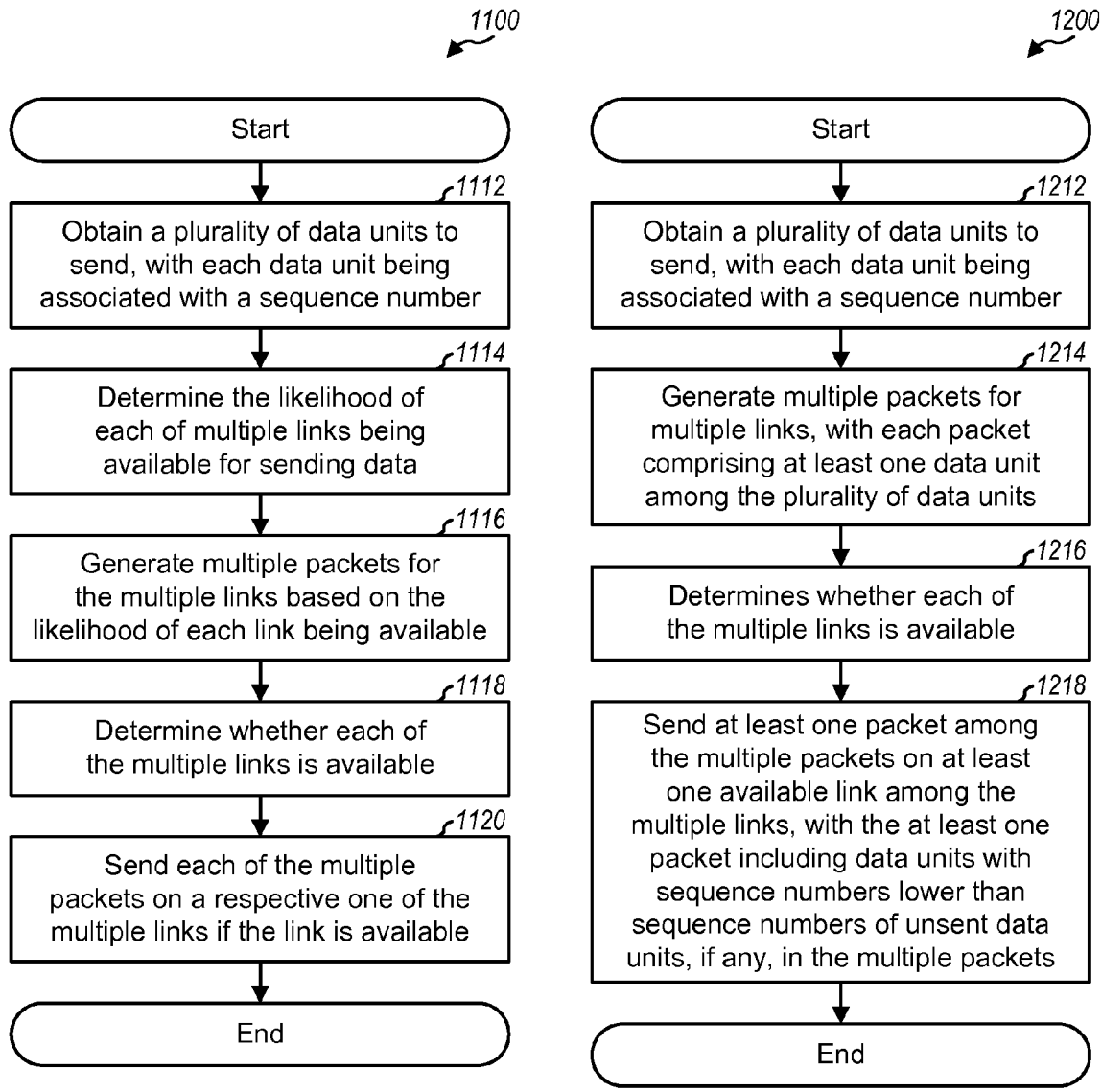
FIG. 11 shows a process for transmitting packets on multiple links.
FIG. 12 shows a process for transmitting packets in order on multiple links.

FIG. 11 shows a design of a process 1100 for transmitting data on multiple links. Each link may correspond to a carrier or some other transmission resources. Process 1100 may be performed by a transmitter, which may be an access terminal for data transmission on the reverse link or an access point for data transmission on the forward link.

The transmitter obtains a plurality of data units to send, with each data unit being associated with a sequence number indicative of the position of that data unit among the plurality of data units (block 1112). The transmitter determines the likelihood of each of multiple links being available for sending data (block 1114). The likelihood of a link being available may be given by a priority number or some other quantity. The transmitter generates multiple packets for the multiple links based on the likelihood of each link being available (block 1116). The multiple packets include a first packet for a first link most likely to be available and a last packet for a last link least likely to be available. The first packet includes a data unit having a lowest sequence number and the last packet includes a data unit having a highest sequence number among all data units in the multiple packets.

For block 1114, the transmitter may determine the likelihood of each link being available based on the number of subpackets sent for a pending packet on that link, if any, e.g., as shown in equation (1). The transmitter may also determine that a link will be available if there is no pending packet on the link or if a maximum number of subpackets has been sent for a pending packet on the link.

For block 1116, the transmitter may generate one packet for each of the multiple links, with packets for links that are progressively less likely to be available including data units with progressively higher sequence numbers. For the third transmission scheme, the transmitter may also generate an additional packet for a second link that is second most likely to be available. The additional packet may include the data unit with the lowest sequence number and may be sent on the second link only if the first link is unavailable.

The transmitter determines whether each of the multiple links is available, e.g., based on an ACK or a NAK received for a pending packet on the link (block 1118). In one design, the transmitter sends each of the multiple packets on a respective one of the multiple links if the link is available (block 1120). In another design, for the fourth transmission scheme, the transmitter sends each of the multiple packets on a respective one of the multiple links if the link is available and if all links that are more likely to be available are also available. This design ensures in-order transmission of packets. For both designs, the transmitter may return data units in unsent packets for unavailable links to a queue for transmission in a subsequent time interval.

FIG. 12 shows a design of a process 1200 for transmitting data in order on multiple links. Process 1200 may also be performed by a transmitter. The transmitter obtains a plurality of data units to send, with each data unit being associated with a sequence number (block 1212). The transmitter generates multiple packets for multiple links, with each packet including at least one data unit among the plurality of data units (block 1214). The transmitter determines whether each of the multiple links is available, e.g., based on an ACK or a NAK received for a pending packet on the link (block 1216). The transmitter sends at least one packet among the multiple packets on at least one available link among the multiple links, with the at least one packet including data units with sequence numbers lower than sequence numbers of unsent data units, if any, in the multiple packets (block 1218).

For block 1214, the transmitter may generate packets for all possible combinations of available links among the multiple links. The transmitter may also generate the multiple packets such that one packet can be sent on each available link and also such that data units in sent packets have lower sequence numbers than the sequence numbers of any unsent data units. The transmitter may generate at least two packets containing different data units for each of at least one link.

In one design for two links, the transmitter may generate a first packet including a data unit with a lowest sequence number for a first link, generate a second packet including a data unit with a higher sequence number for a second link, and generate a third packet including the data unit with the lowest sequence number for the second link. The transmitter may send the first packet on the first link and the second packet on the second link if the both links are available. The transmitter may send only the first packet on the first link if only the first link is available and may send only the third packet on the second link if only the second link is available.

In one design for three links, the transmitter may generate up to seven packets for the three links. The transmitter may send up to three packets on up to three available links, with the up to three sent packets including data units with lower sequence numbers than the sequence numbers of unsent data units, if any, in the up to seven packets.

For all of the transmission schemes described above, multiple packets may be sent starting at the same time but may be decoded out of order. Out-of-order reception can occur when a packet containing data units with lower sequence numbers is decoded later than a packet containing data units with higher sequence numbers.

Figure 13:
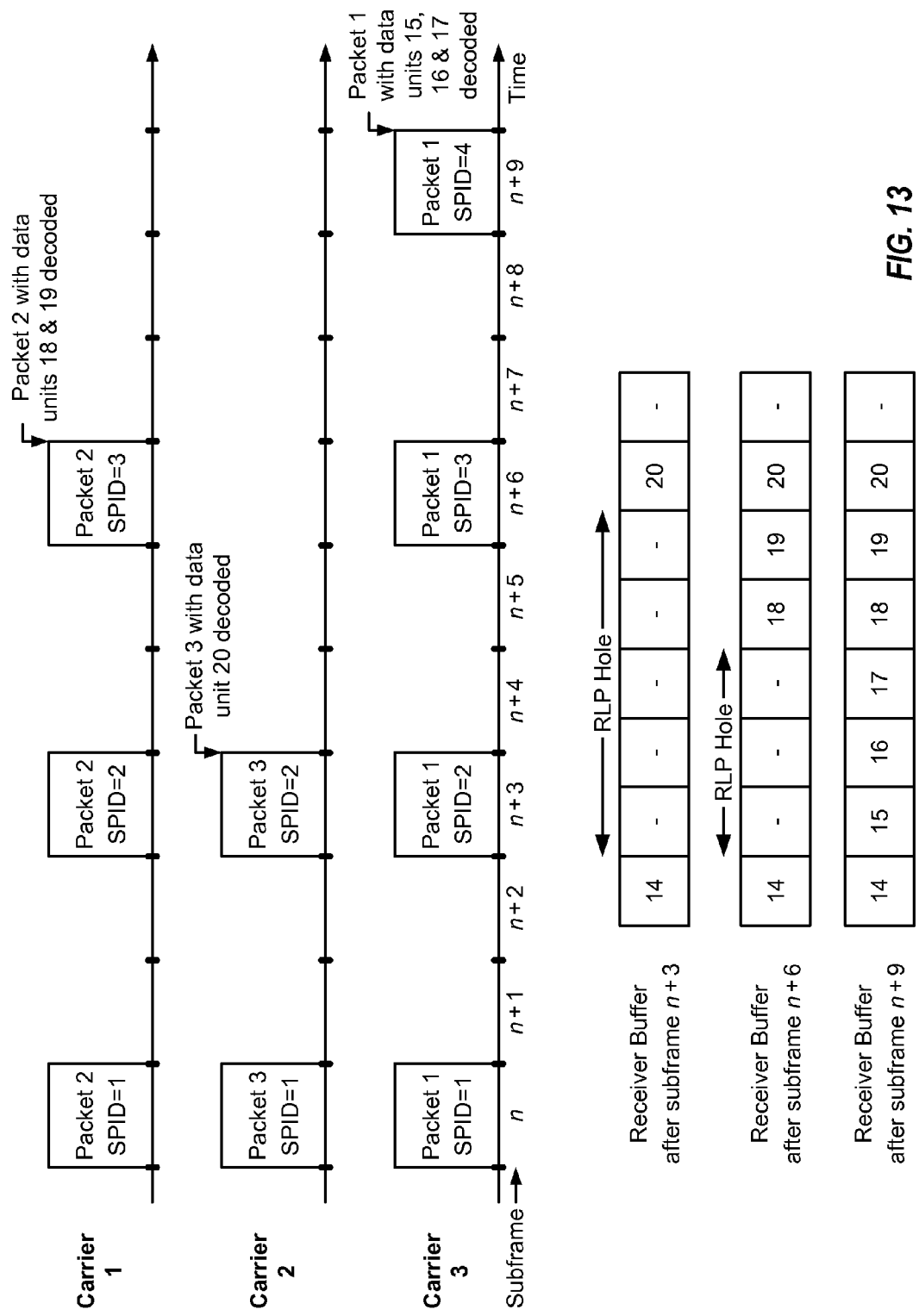
FIG. 13 shows data reception and a re-assembly buffer at a receiver.

FIG. 13 shows an example of out-of-order reception for multiple packets sent starting at the same time. In this example, the transmitter sends packet 1 containing data units 15, 16 and 17 on carrier 3 (which may have the highest priority), packet 2 containing data units 18 and 19 on carrier 1 (which may have the second highest priority), and packet 3 containing data unit 20 on carrier 2 (which may have the lowest priority). The transmitter sends the first subpackets of packets 2, 3 and 1 on carriers 1, 2 and 3, respectively, in subframe n. The receiver decodes each packet in error. The transmitter then sends the second subpackets of packets 2, 3 and 1 on carriers 1, 2 and 3, respectively, in subframe n+3. The receiver decodes packet 3 correctly and recovers data unit 20. The transmitter then sends the third subpackets of packets 2 and 1 on carriers 1 and 3, respectively, in subframe n+6. The receiver decodes packet 2 correctly and recovers data units 18 and 19. The transmitter then sends the fourth subpacket of packet 1 on carrier 3 in subframe n+9. The receiver decodes packet 1 correctly and recovers data units 15, 16 and 17. In this example, even though the three packets are sent starting at the same time, the receiver obtains the data units out of order because more subpackets are needed to correctly decode the packets containing the data units with lower sequence numbers.

The sequence numbers may be assigned by RLP, and an RLP hole may be created when a packet containing data units with higher sequence numbers is decoded before a packet containing data units with lower sequence numbers. In the example shown in FIG. 13, an RLP hole covering data units 15 through 19 is created in subframe n+3 when packet 3 containing data unit 20 is decoded correctly. A packet causing an RLP hole may be referred to as an earlier arrived packet.

Whenever an RLP hole is detected, the receiver may send an RLP NAK for the RLP hole to trigger retransmission of the missing data units. However, the receiver may delay sending the RLP NAK by a predetermined amount of time of T ms, where T may be a suitable value. In one design, T is the maximum termination time for all packets sent starting at the same time as the earlier arrived packet. In the example shown in FIG. 13, the maximum termination time may be four subpackets, and the RLP NAK may be sent after receiving the fourth subpacket in subframe n+9. This design ensures that each packet has sufficient time to terminate before sending an RLP NAK.

The transmitter may send multiple packets in order in different subframes. However, the receiver may decode a later sent packet prior to an earlier sent packet and would then detect an RLP hole. In one design, the receiver may delay sending an RLP NAK by an amount of time determined by the maximum termination time of the earlier sent packet. For example, the maximum termination time may be four subpackets, packet 1 may be sent starting in subframe n, and packet 2 may be sent starting in subframe n+3 and may be decoded prior to packet 1. The receiver may delay sending an RLP NAK until after four subpackets have been received for packet 1, which is after subframe n+9.

In the first and third transmission schemes described above, packets may be sent out of order due to pending packets not terminating as predicted on the K carriers. The receiver may detect an RLP hole due to out-of-order transmission of packets. The receiver may delay sending an RLP NAK for the RLP hole by an amount of time determined based on (i) the maximum termination time for unsent out-of-order data units and (ii) an assumption that these data units will be sent at the next transmission opportunity.

In general, the receiver may delay sending an RLP NAK for a detected RLP hole by an amount of time to allow the transmitter to send the missing data units at the earliest transmission opportunity. This may then avoid or reduce spurious RLP NAKs due to early termination of packets sent on different carriers.

Figure 14:
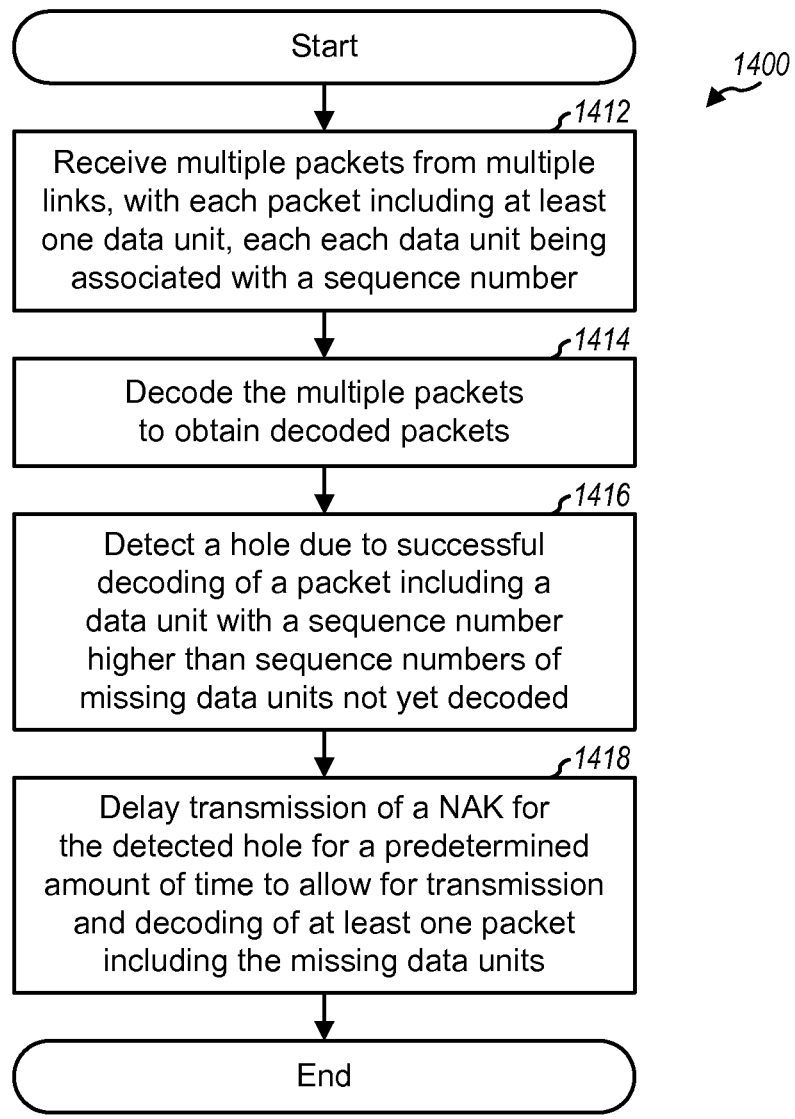
FIG. 14 shows a process for receiving packets via multiple links.

FIG. 14 shows a design of a process 1400 for receiving data via multiple links. Process 1400 may be performed by a receiver, which may be an access point for data transmission on the reverse link or an access terminal for data transmission on the forward link.

The receiver receives multiple packets from multiple links, with each packet including at least one data unit, each data unit being associated with a sequence number indicative of the position of that data unit among a plurality of data units (block 1412). The multiple packets may be (i) generated by a transmitter based on the likelihood of each of the multiple links being available for sending data or (ii) sent by the transmitter to ensure in-order transmission of the multiple packets. The receiver decodes the multiple packets to obtain decoded packets (block 1414).

The receiver may detect a hole due to successful decoding of a packet including a data unit with a sequence number higher than sequence numbers of missing data units not yet decoded (block 1416). The receiver may delay transmission of a NAK for the detected hole for a predetermined amount of time to allow for transmission and decoding of at least one packet including the missing data units (block 1418).

The at least one packet with the missing data units may be transmitted starting at same time or earlier than the packet successfully decoded. The receiver may then delay transmission of the NAK until a maximum transmission time for the at least one packet has elapsed. The at least one packet with the missing data units may also be transmitted starting later than the packet successfully decoded. The receiver may then delay transmission of the NAK until an expected maximum transmission time for the at least one packet has elapsed. The receiver may determine the expected maximum transmission time based on (i) an assumption that the at least one packet will be sent at the next transmission opportunity and (ii) the maximum transmission time for the at least one packet.

Figure 15:
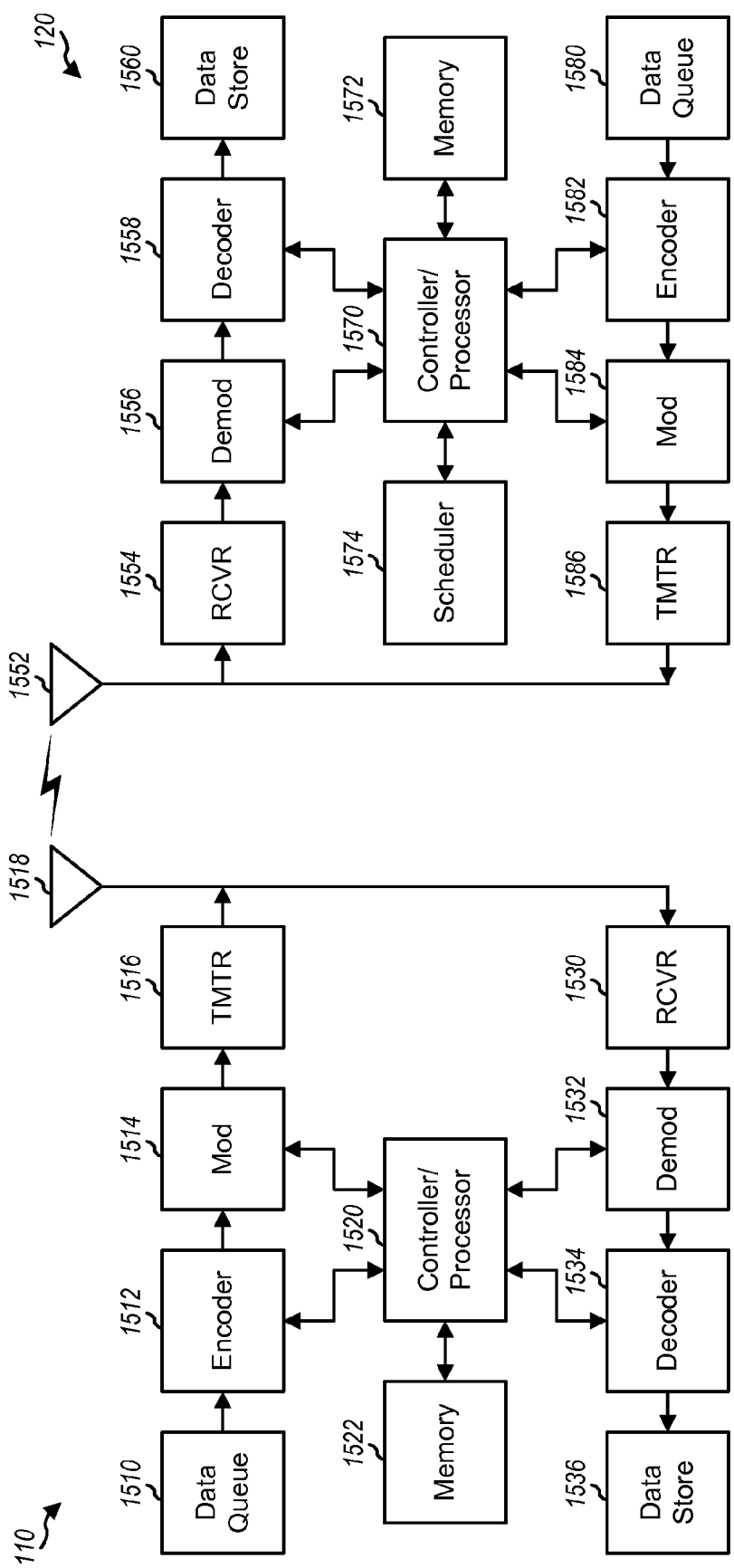
FIG. 15 shows a block diagram of an access terminal and an access point.

FIG. 15 shows a block diagram of a design of access terminal 110 and access point 120 in FIG. 1. For data transmission on the reverse link, at access terminal 110, an encoder 1512 receives data from a data queue 1510, generates one or more packets, encodes each packet to obtain a coded packet, and partitions each coded packet into multiple subpackets. A modulator (Mod) 1514 receives subpackets for pending packets and processes each subpacket for transmission. The processing by modulator 1514 may include symbol mapping, channelization, spectral spreading, etc. A transmitter (TMTR) 1516 processes the output from modulator 1514 and generates a reverse link signal, which is transmitted via an antenna 1518.

At access point 120, the reverse link signal is received by an antenna 1552 and processed by a receiver (RCVR) 1554 to obtain samples. A demodulator (Demod) 1556 processes (e.g., despreads, dechannelizes, and data demodulates) the samples and provides demodulated symbols. A decoder 1558 decodes the demodulated symbols for each pending packet and checks each decoded packet. Decoder 1558 provides the status of each decoded packet to a controller/processor 1570 and provides the packet (if decoded correctly) to a data store 1560. The processing by demodulator 1556 and decoder 1558 at access point 120 is complementary to the processing by modulator 1514 and encoder 1512, respectively, at access terminal 110.

On the forward link, ACKs/NAKs for pending packets are encoded by an encoder 1582, further processed by a modulator 1584, and conditioned by a transmitter 1586 to generate a forward link signal, which is transmitted via antenna 1552. At access terminal 110, the forward link signal is received by antenna 1518 and processed by a receiver 1530 to obtain samples. A demodulator 1532 processes the samples and provides demodulated symbols. A decoder 1534 further processes the demodulated symbols and provides the ACK/NAK feedback. A controller/processor 1520 directs transmission of subpackets for pending and new packets based on the ACK/NAK feedback. Data transmission on the forward link may occur in a manner analogous to the data transmission on the reverse link.

Controllers/processors 1520 and 1570 may direct the operation at access terminal 110 and access point 120, respectively. Controller/processor 1520 and/or 1570 may implement or direct process 1100 in FIG. 11, process 1200 in FIG. 12, process 1400 in FIG. 14, and/or other processes for the techniques described herein. Memories 1522 and 1572 store program codes and data for access terminal 110 and access point 120, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication system, comprising:
   obtaining a plurality of data units to send, each data unit being associated with a sequence number indicative of a position of the data unit among the plurality of data units;
   determining likelihood of each of multiple links being available for sending data; and generating multiple packets for the multiple links based on the likelihood of each link being available, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets;
   wherein the determining the likelihood of each of the multiple links being available comprises determining the likelihood of each link with a pending packet being available based on number of subpackets sent for the pending packet.

2. The method of claim 1, wherein the determining the likelihood of each of the multiple links being available comprises determining that a link will be available if there is no pending packet on the link or if a maximum number of subpackets has been sent for a pending packet on the link.

3. The method of claim 1, wherein the generating the multiple packets for the multiple links comprises generating one packet for each of the multiple links, with packets for links progressively less likely to be available comprising data units with progressively higher sequence numbers.

4. The method of claim 3, wherein the generating the multiple packets for the multiple links further comprises generating an additional packet for a second link second most likely to be available, the additional packet comprising the data unit having the lowest sequence number and being sent on the second link only if the first link is unavailable.

5. The method of claim 1, further comprising:
   determining whether each of the multiple links is available; and
   sending each of the multiple packets on a respective one of the multiple links if the link is available.

6. The method of claim 1, further comprising:
   determining whether each of the multiple links is available; and
   sending each of the multiple packets on a respective one of the multiple links if the link is available and if all links more likely to be available are also available.

7. The method of claim 1, further comprising:
   returning data units in each packet not sent on an unavailable link to a queue for transmission in a subsequent time interval.

8. The method of claim 1, wherein the multiple links correspond to multiple carriers, one link for each carrier.

9. The method of claim 1, further comprising:
   assigning a sequence number to each data unit.

10. The method of claim 9, wherein the data units are assigned sequentially increasing sequence numbers.

11. The method of claim 9, wherein the earliest data unit in a data queue is assigned a lowest sequence number.

12. The method of claim 9, wherein the sequence number is assigned by Radio Link Protocol.

13. The method of claim 1, wherein the data units with a lowest sequence number are provided to a new packet for a carrier with the highest priority.

14. An apparatus for transmitting data in a wireless communication system, comprising:
   means for obtaining a plurality of data units to send, each data unit being associated with a sequence number indicative of a position of the data unit among the plurality of data units;
   means for determining likelihood of each of multiple links being available for sending data; and
   means for generating multiple packets for the multiple links based on the likelihood of each link being available, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets;
   wherein the determining the likelihood of each of the multiple links being available comprises determining the likelihood of each link with a pending packet being available based on number of subpackets sent for the pending packet.

15. The apparatus of claim 14, wherein the means for determining the likelihood of each of the multiple links being available comprises
   means for determining the likelihood of each link with a pending packet being available based on number of subpackets sent for the pending packet, and
   means for determining that a link will be available if there is no pending packet on the link or if a maximum number of subpackets has been sent for a pending packet on the link.

16. The apparatus of claim 14, wherein the means for generating the multiple packets for the multiple links comprises means for generating one packet for each of the multiple links, with packets for links progressively less likely to be available comprising data units with progressively higher sequence numbers.

17. The apparatus of claim 14, further comprising:
   means for determining whether each of the multiple links is available; and
   means for sending each of the multiple packets on a respective one of the multiple links if the link is available.

18. An apparatus for a wireless communication system, comprising:
   at least one processor configured to obtain a plurality of data units to send, each data unit being associated with a sequence number indicative of a position of the data unit among the plurality of data units, to determine likelihood of each of multiple links being available for sending data, and to generate multiple packets for the multiple links based on the likelihood of each link being available, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets; and
   memory coupled to the processor,
   wherein the determining the likelihood of each of the multiple links being available comprises determining the likelihood of each link with a pending packet being available based on number of subpackets sent for the pending packet.

19. The apparatus of claim 18, wherein the at least one processor is configured to determine the likelihood of each link with a pending packet being available based on number of subpackets sent for the pending packet, and to determine that a link will be available if there is no pending packet on the link or if a maximum number of subpackets has been sent for a pending packet on the link.

20. The apparatus of claim 18, wherein the at least one processor is configured to generate one packet for each of the multiple links, with packets for links progressively less likely to be available comprising data units with progressively higher sequence numbers.

21. The apparatus of claim 18, wherein the at least one processor is configured to determine whether each of the multiple links is available, and to send each of the multiple packets on a respective one of the multiple links if the link is available.

22. A non-transitory computer-readable medium comprising instructions for causing a processor to perform a method, the method comprising:
   obtaining a plurality of data units to send, each data unit being associated with a sequence number indicative of a position of the data unit among the plurality of data units,
   determining likelihood of each of multiple links being available for sending data; and
   generating multiple packets for the multiple links based on the likelihood of each link being available, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets;
   wherein the determining the likelihood of each of the multiple links being available comprises determining the likelihood of each link with a pending packet being available based on number of subpackets sent for the pending packet.

23. The non-transitory computer-readable medium of claim 22, wherein the method further comprises:
   determining the likelihood of each link with a pending packet being available based on number of subpackets sent for the pending packet; and
   determining that a link will be available if there is no pending packet on the link or if a maximum number of subpackets has been sent for a pending packet on the link.

24. The non-transitory computer-readable medium of claim 22, wherein the method further comprises:
   generating one packet for each of the multiple links, with packets for links progressively less likely to be available comprising data units with progressively higher sequence numbers.

25. The non-transitory computer-readable medium of claim 22, wherein the method further comprises:
   determining whether each of the multiple links is available; and
   sending each of the multiple packets on a respective one of the multiple links if the link is available.

26. A method of transmitting data in a wireless communication system, comprising:
   obtaining a plurality of data units to send, each data unit being associated with a sequence number indicative of a position of the data unit among the plurality of data units;
   generating multiple packets for multiple links, each packet comprising at least one data unit among the plurality of data units;

determining whether each of the multiple links is available; and sending at least one packet among the multiple packets on at least one available link among the multiple links, the at least one packet comprising data units with sequence numbers lower than sequence numbers of unsent data units, if any, in the multiple packets;

wherein the multiple links comprise first and second links, and wherein the generating the multiple packets for the multiple links comprises generating a first packet comprising a data unit with a lowest sequence number for the first link, generating a second packet comprising a data unit with a higher sequence number for the second link, and generating a third packet comprising the data unit with the lowest sequence number for the second link;

wherein the sending the at least one packet comprises sending the first packet on the first link and the second packet on the second link if the first and second links are both available, sending only the first packet on the first link if only the first link is available, and sending only the third packet on the second link if only the second link is available.

27. The method of claim 26, wherein the generating the multiple packets for the multiple links comprises generating packets for all possible combinations of available links among the multiple links.

28. The method of claim 26, wherein the generating the multiple packets for the multiple links comprises generating the multiple packets such that one packet can be sent on each available link and data units in sent packets have sequence numbers lower than sequence numbers of any unsent data units.

29. The method of claim 26, wherein the generating the multiple packets for the multiple links comprises generating at least two packets comprising different data units for each of at least one link among the multiple links.

30. The method of claim 26, wherein the multiple links comprise three links, wherein the generating the multiple packets for the multiple links comprises generating up to seven packets for the three links, and wherein the sending the at least one packet comprises sending up to three packets on up to three available links, the up to three packets comprising data units with lower sequence numbers than sequence numbers of unsent data units, if any, in the up to seven packets.

31. A method of receiving data in a wireless communication system, comprising:
receiving multiple packets from multiple links, each packet comprising at least one data unit, each data unit being associated with a sequence number indicative of a position of the data unit among a plurality of data units, the multiple packets being generated by a transmitter based on likelihood of each of the multiple links being available for sending data, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets; and
decoding the multiple packets to obtain decoded packets;
wherein the determining the likelihood of each of the multiple links being available comprises determining the likelihood of each link with a pending packet being available based on number of subpackets sent for the pending packet.

32. The method of claim 31, further comprising:
detecting a hole due to successful decoding of a packet comprising a data unit with a sequence number higher than sequence numbers of missing data units not yet decoded; and
delaying transmission of a negative acknowledgement (NAK) for the detected hole for a predetermined amount of time to allow for transmission and decoding of at least one packet comprising the missing data units.

33. The method of claim 32, wherein transmission of the at least one packet comprising the missing data units starts at same time or earlier than the packet successfully decoded, and wherein the delaying transmission of the NAK for the detected hole comprises delaying transmission of the NAK until a maximum transmission time for the at least one packet has elapsed.

34. The method of claim 32, wherein transmission of the at least one packet comprising the missing data units starts later than the packet successfully decoded, and wherein the delaying transmission of the NAK for the detected hole comprises delaying transmission of the NAK until an expected maximum transmission time for the at least one packet has elapsed.

35. The method of claim 34, further comprising:
determining the expected maximum transmission time for the at least one packet based on the at least one packet being sent at next transmission opportunity and a maximum transmission time for the at least one packet.

36. An apparatus for receiving data in a wireless communication system, comprising:
means for receiving multiple packets from multiple links, each packet comprising at least one data unit, each data unit being associated with a sequence number indicative of a position of the data unit among a plurality of data units, the multiple packets being generated by a transmitter based on likelihood of each of the multiple links being available for sending data, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets; and
means for decoding the multiple packets to obtain decoded packets;
wherein the determining the likelihood of each of the multiple links being available comprises determining the likelihood of each link with a pending packet being available based on number of subpackets sent for the pending packet.

37. The apparatus of claim 36, further comprising:
means for detecting a hole due to successful decoding of a packet comprising a data unit with a sequence number higher than sequence numbers of missing data units not yet decoded; and
means for delaying transmission of a negative acknowledgement (NAK) for the detected hole for a predetermined amount of time to allow for transmission and decoding of at least one packet comprising the missing data units.

38. The apparatus of claim 37, wherein transmission of the at least one packet comprising the missing data units starts at same time or earlier than the packet successfully decoded, and wherein the means for delaying transmission of the NAK for the detected hole comprises means for delaying transmission of the NAK until a maximum transmission time for the at least one packet has elapsed.

39. The apparatus of claim 37, wherein transmission of the at least one packet comprising the missing data units starts later than the packet successfully decoded, and wherein the means for delaying transmission of the NAK for the detected hole comprises means for delaying transmission of the NAK until an expected maximum transmission time for the at least one packet has elapsed.

40. An apparatus for receiving data in a wireless communication system, comprising:
At least one processor configured to receive multiple packets from multiple links, each packet comprising at least one data unit, each data unit being associated with a sequence number indicative of a position of the data unit among a plurality of data units, the multiple packets being generated by a transmitter based on likelihood of each of the multiple links being available for sending data, the multiple packets comprising a first packet for a first link most likely to be available and a last packet for a last link least likely to be available, the first packet comprising a data unit having a lowest sequence number and the last packet comprising a data unit having a highest sequence number among all data units in the multiple packets, and to decode the multiple packets to obtain decoded packets; and
memory coupled to the processor;
wherein the determining the likelihood of each of the multiple links being available comprises determining the likelihood of each link with a pending packet being available based on number of subpackets sent for the pending packet.

41. The apparatus of claim 40, wherein the at least one processor is configured to detect a hole due to successful decoding of a packet comprising a data unit with a sequence number higher than sequence numbers of missing data units not yet decoded, and to delay transmission of negative acknowledgement (NAK) for the detected hole for a predetermined amount of time to allow for transmission and decoding of at least one packet comprising the missing data units.

42. The apparatus of claim 41, wherein transmission of the at least one packet comprising the missing data units starts at same time or earlier than the packet successfully decoded, and wherein at least one processor is configured to delay transmission of the NAK until a maximum transmission time for the at least one packet has elapsed.

43. The apparatus of claim 41, wherein transmission of the at least one packet comprising the missing data units starts later than the packet successfully decoded, and wherein at least one processor is configured to delay transmission of the NAK until an expected maximum transmission time for the at least one packet has elapsed.

* * * * *